(12) United States Patent
Choi et al.

(10) Patent No.: US 12,489,110 B2
(45) Date of Patent: Dec. 2, 2025

(54) POSITIVE ELECTRODE HAVING EXCELLENT ALKALI RESISTANCE, METHOD OF MANUFACTURING THE SAME, AND METAL-AIR BATTERY AND ELECTROCHEMICAL DEVICE INCLUDING THE POSITIVE ELECTRODE

(71) Applicant: Samsung Electronics Co., Ltd., Suwon-si (KR)

(72) Inventors: Wonsung Choi, Hwaseong-si (KR); Kyounghwan Choi, Suwon-si (KR); Mokwon Kim, Suwon-si (KR); Hyunpyo Lee, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 166 days.

(21) Appl. No.: 17/190,785

(22) Filed: Mar. 3, 2021

(65) Prior Publication Data

US 2021/0313569 A1    Oct. 7, 2021

(30) Foreign Application Priority Data

Apr. 6, 2020   (KR) .................. 10-2020-0041707

(51) Int. Cl.
| | | |
|---|---|---|
| *H01M 4/48* | (2010.01) | |
| *H01M 4/02* | (2006.01) | |
| *H01M 12/08* | (2006.01) | |

(52) U.S. Cl.
CPC ........... *H01M 4/483* (2013.01); *H01M 12/08* (2013.01); *H01M 2004/028* (2013.01)

(58) Field of Classification Search
CPC .......... H01M 4/36; H01M 4/48; H01M 4/131; H01M 4/382; H01M 4/483; H01M 4/664;
(Continued)

(56) References Cited

U.S. PATENT DOCUMENTS

| | | |
|---|---|---|
| 5,932,146 A | 8/1999 | Kuo et al. |
| 10,714,759 B2 | 7/2020 | Kim et al. |

(Continued)

FOREIGN PATENT DOCUMENTS

| | | | | |
|---|---|---|---|---|
| EP | 3012891 A1 | 4/2016 | | |
| EP | 2720794 B1 | * 11/2018 | ............ | B01J 21/063 |

(Continued)

OTHER PUBLICATIONS

Labhsetwar, Nitin K., A. Watanabe, and T. Mitsuhashi. "New improved syntheses of LaRuO3 perovskites and their applications in environmental catalysis." Applied Catalysis B: Environmental 40.1 (2003): 21-30 (Year: 2003).*

(Continued)

*Primary Examiner* — Matthew T Martin
*Assistant Examiner* — Jared Hansen
(74) *Attorney, Agent, or Firm* — CANTOR COLBURN LLP

(57) ABSTRACT

A metal-air battery including a positive electrode layer that includes a lithium-ion conductive solid electrolyte membrane and a porous electroconductive metal oxide represented by Formula 1, wherein the electroconductive metal oxide has a specific surface area of about 0.01 m²/g to about 1000 m²/g, $$L_xRu_yO_x \quad \text{Formula 1}$$

wherein, in Formula 1,
L is at least one of a lanthanide element or an actinide element, and
$0<x<1$, $0<y<1$, and $0<z\le1$.
a negative electrode layer, and an electrolyte disposed between the positive electrode layer and the negative electrode layer.

22 Claims, 5 Drawing Sheets

(58) Field of Classification Search
CPC ............ H01M 4/0471; H01M 4/8605; H01M 4/8673; H01M 4/9016; H01M 12/06; H01M 12/08; H01M 2004/021; H01M 2004/028; H01M 2004/8689; H01M 2300/006; Y02E 60/10
See application file for complete search history.

(56) References Cited

U.S. PATENT DOCUMENTS

| | | | | |
|---|---|---|---|---|
| 2005/0271941 | A1* | 12/2005 | Bushong | H01M 4/50 429/219 |
| 2012/0082922 | A1* | 4/2012 | Yamaki | C04B 35/62897 429/535 |
| 2013/0089796 | A1* | 4/2013 | Sun | H01M 12/06 429/405 |
| 2013/0216922 | A1* | 8/2013 | Zheng | H01M 12/08 429/405 |
| 2015/0228984 | A1* | 8/2015 | Ball | H01M 12/08 429/405 |
| 2020/0255296 | A1* | 8/2020 | Ogawa | H01M 4/90 |
| 2021/0226225 | A1* | 7/2021 | Lanning | H01M 4/466 |

FOREIGN PATENT DOCUMENTS

| | | | |
|---|---|---|---|
| JP | 2015529945 | A | 10/2015 |
| JP | 2015195194 | A | 11/2015 |
| KR | 100439394 | B1 | 9/2004 |
| KR | 1020130040311 | A | 4/2013 |
| KR | 1020130083138 | A | 7/2013 |
| KR | 101762282 | B1 | 7/2017 |

OTHER PUBLICATIONS

Kimura, Masanori, et al. "Preparation of LaRuO3 films by microwave plasma-enhanced chemical vapor deposition." Thin solid films 520.6 (2012): 1847-1850 (Year: 2012).*

Sinclair, Alexandra, et al. "Synthesis and properties of lanthanide ruthenium (III) oxide perovskites." Angewandte Chemie International Edition 53.32 (2014): 8343-8347 (Year: 2014).*

EP2720794B1, Roger Glaser, et al, "Mixed metal oxide-based porous materials and the production and use thereof", machine English translation retrieved from https://worldwide.espacenet.com/ Oct. 26, 2022 (Year: 2018).*

Chang, Seo Hyoung, et al. "Functional links between stability and reactivity of strontium ruthenate single crystals during oxygen evolution." Nature communications 5.1 (2014): 4191 (Year: 2014).*

Kim, Bae-Jung, et al. "Unraveling thermodynamics, stability, and oxygen evolution activity of strontium ruthenium perovskite oxide." Acs Catalysis 7.5 (2017): 3245-3256 (Year: 2017).*

Lan, Aidong, and Alexander S. Mukasyan. "Perovskite-based catalysts for direct methanol fuel cells." The Journal of Physical Chemistry C 111.26 (2007): 9573-9582 (Year: 2007).*

Lan, Aidong, and Alexander S. Mukasyan. "Complex SrRuO3—Pt and LaRuO3—Pt catalysts for direct alcohol fuel cells." Industrial & engineering chemistry research 47.23 (2008): 8989-8994 (Year: 2008).*

Bernicke, Michael, et al. "Iridium oxide coatings with templated porosity as highly active oxygen evolution catalysts: structure-activity relationships." ChemSusChem 8.11 (2015): 1908-1915 (Year: 2015).*

Ortel, Erik, et al. "Mesoporous IrO2 films templated by PEO-PB-PEO block-copolymers: self-assembly, crystallization behavior, and electrocatalytic performance." Chemistry of Materials 23.13 (2011): 3201-3209 (Year: 2011).*

Cheng, Fangyi, et al. "Metal-air batteries: from oxygen reduction electrochemistry to cathode catalysts." Chemical Society Reviews 41.6 (2012): 2172-2192 (Year: 2012).*

Abreu-Sepulveda Maria et al., "Investigation of Oxygen Evolution Reaction at LaRuO3, La3.5Ru4O13, and La2RuO5," vol. 180, Electrochimica Acta, Aug. 2015, 401-408.

European Search Report for European Patent Application No. 21162243.6 dated Sep. 13, 2021.

Maria Abreu-Sepulvedaa et al., "Investigation of Oxygen Evolution Reaction at LaRuO3, La3.5Ru4O13, and La2RuO5," Electrochimica Acta, Aug. 20, 2015, pp. 401-408, vol. 180.

Office Action dated Apr. 14, 2025, in corresponding KR Patent Application No. 10-2020-0041707, 9 pp., (with English Translation, 8 pp).

* cited by examiner

POSITIVE ELECTRODE HAVING EXCELLENT ALKALI RESISTANCE, METHOD OF MANUFACTURING THE SAME, AND METAL-AIR BATTERY AND ELECTROCHEMICAL DEVICE INCLUDING THE POSITIVE ELECTRODE

CROSS-REFERENCE TO RELATED APPLICATION

This application claims priority to and the benefit of Korean Patent Application No. 10-2020-0041707, filed on Apr. 6, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to a positive electrode having excellent alkali resistance, a method of manufacturing the same, and a metal-air battery and an electrochemical device, which include the positive electrode.

2. Description of the Related Art

A lithium-air battery includes a lithium metal negative electrode and a positive electrode using oxygen from the air as an active material. Reduction/oxidation reaction of oxygen takes place in the positive electrode, while oxidation/reduction reaction of lithium takes place in the negative electrode. In a lithium-air battery, chemical energy generated from an oxidation/reduction reaction is converted into electrical energy, and the electrical energy is output. For example, a lithium-air battery may absorb oxygen during discharge, and emit oxygen during charge. When the lithium-air battery uses oxygen in the air as an active material, the lithium-air battery may have an energy density several times that of a lithium-ion battery.

The capacity or performance of a lithium-air battery may vary according to a material and a structure of the positive electrode (i.e., air electrode). Although carbon materials have been used in existing positive electrodes, due to their weak resistance to oxidation, the carbon materials may produce carbonate. Carbonate does not easily decompose, and causes lifespan characteristics of a lithium-air battery to deteriorate.

As a non-carbonaceous positive electrode material, an electronic conductor may include an oxide such as $RuO_2$ or indium tin oxide (ITO). However, these oxides are unstable under basic conditions, or have low sinterability and poor lifespan characteristics.

Therefore, there remains a need for a highly durable positive electrode material that has excellent electronic conductivity and is stable even under basic conditions, such that the positive electrode material is able to be utilized in various metal-air batteries, including lithium-air batteries.

SUMMARY

Provided is a positive electrode that is stable even under basic conditions has improved lifespan characteristics.

Provided is a method of manufacturing the positive electrode.

Provided is a metal-air battery including the positive electrode.

Provided is an electrochemical device including the positive electrode.

Additional aspects will be set forth in part in the description which follows and, in part, will be apparent from the description.

According to an aspect, a positive electrode includes:
a porous electroconductive metal oxide represented by Formula 1,
wherein the electroconductive metal oxide has a specific surface area of about 0.01 square meter per gram to about 1000 square meters per gram, $$L_xRu_yO_z \qquad \text{Formula 1}$$

wherein, in Formula 1,
L is at least one of a lanthanide element or an actinide element, and
$0<x<1$, $0<y<1$, and $0<z\le 1$.

According to an aspect, a method of manufacturing a positive electrode includes:
mixing an L-containing compound including at least one of a lanthanide element or an actinide element, a ruthenium (Ru)-containing compound, and a solvent to provide a mixture,
heat-treating the mixture to prepare the positive electrode, wherein the positive electrode includes a metal oxide represented by Formula 1, $$L_xRu_yO_z \qquad \text{Formula 1}$$

wherein, in Formula 1,
L is at least one of a lanthanide element or an actinide element, and
$0<x<1$, $0<y<1$, and $0<z\le 1$, and wherein the metal oxide is porous and has a specific surface area of about 0.01 square meter per gram to about 1000 square meters per gram.

According to an aspect, a metal-air battery includes:
a positive electrode layer including a positive electrode support including the positive electrode according to claim 1 and oxygen as a positive electrode active material;
a negative electrode layer including at least one of a metal or a metal alloy; and
an electrolyte disposed between the positive electrode layer and the negative electrode layer.

According to an aspect, an electrochemical device includes the positive electrode.

According to an aspect, a positive electrode includes a porous electroconductive metal oxide represented by at least one of $La_{3/7}Ru_{1/7}O$ or $La_{1/3}Ru_{1/3}O$, wherein the electroconductive metal oxide has a specific surface area of about 0.01 square meter per gram to about 1000 square meters per gram.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which example embodiments are shown. The present disclosure may, however, be embodied in many different forms, should not be construed as being limited to the embodiments set forth herein, and should be construed as including all modifications, equivalents, and alternatives within the scope of the present disclosure.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "has," "comprises," "having," and/or "comprising," when used in this specification, specify the presence of stated features, integers, steps, operations, elements, and/or components, but do not preclude the presence or addition of one or more other features, integers, steps, operations, elements, parts, components, materials, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present disclosure is not limited thereto. Throughout the written description and drawings, like reference numbers and labels will be used to denote like or similar elements. It will also be understood that when an element such as a layer, a film, a region, a component, or a plate is referred to as being "on" another layer or element, it can be "directly on" the other layer or element, or intervening layers, regions, or components may also be present. Although the terms "first," "second," "third," etc. may be used herein to describe various elements, components, regions, and/or layers, these elements, components, regions, and/or layers should not be limited by these terms. These terms are used only to distinguish one component from another, not for purposes of limitation.

The terminology used herein is for the purpose of describing particular embodiments only and is not intended to be limiting. "Or" means "and/or."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10% or 5% of the stated value.

A perovskite compound is a compound that is isostructural with perovskite, i.e., CaTiO$_3$.

The electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

Hereinafter, example embodiments of a solid electrolyte, a method of preparing the same, and a metal-air battery and an electrochemical device which include the same will be described in greater detail.

According to an aspect, provided is a positive electrode including an electroconductive metal oxide represented by Formula 1, the metal oxide being porous and having a specific surface area of about 0.01 m²/g to about 1000 m²/g or about 2 m²/g to about 10 m²/g.

Formula 1

In Formula 1, L is at least one of a lanthanide element or an actinide element, $0<x<1$, $0<y<1$, and $0<z\leq1$.

The metal oxide represented by Formula 1, a non-carbonaceous positive electrode material, which can be used in a metal-air battery, may have a higher electronic conductivity as compared with existing carbonaceous positive electrode materials, and excellent durability due to being chemically stable even under basic conditions, and may improve lifespan characteristics of a metal-air battery.

In Formula 1, L may be at least one of a lanthanide element or an actinide element.

The alkali stability of an oxide (M-O) of each element in the periodic table of the elements may be determined from a $\Delta G_{gibbs}$ value calculated using Equation 1.

$$\Delta G_{gibbs} = E(\text{hydrate}) - E(\text{oxide}) \quad \text{Equation 1}$$

In Equation 1, $\Delta G_{gibbs}$ is the Gibbs free energy of an element, and can be calculated as a difference between E(hydrate) and E(oxide) values.

If the value of $\Delta G_{gibbs}$ is smaller than 0, the oxide M-O may be stable when present in hydrate form. Also, if the value of $\Delta G_{gibbs}$ is more than 0, the oxide M-O may be stable when present in an anhydride form. However, generation of a metal hydroxide may become difficult the larger the value of $\Delta G_{gibbs}$, and thus alkali resistance may be high.

The positive electrode may include a metal oxide including at least one of a lanthanide element or an actinide element having excellent alkali resistance with a relatively high value of $\Delta G_{gibbs}$. In Formula 1, L is at least one of a lanthanide element or an actinide element, and the metal oxide represented by Formula 1 may be chemically stable even under basic conditions due to the alkali stability of L-O.

In an embodiment, in Formula 1, L may be at least one of lanthanum (La), cerium (Ce), praseodymium (Pr), neodymium (Nd), promethium (Pm), actinium (Ac), thorium (Th), or protactinium (Pa). For example, L may be lanthanum (La) having higher alkali stability.

In the metal oxide represented by Formula 1, ruthenium (Ru) is an element that contributes to ensuring high electronic conductivity. The metal oxide, which is a composite oxide of an element (L) that is at least one of a lanthanide element or an actinide element, and ruthenium (Ru), may have high alkali stability and high electronic conductivity.

In an embodiment, the metal oxide may be represented by Formula 1a.

Formula 1a

In Formula 1a, $0<x<1$, $0<y<1$, and $0<z\leq1$.

In an embodiment, the metal oxide may be at least one of $La_{7/26}Ru_{4/13}O$, $La_{1/3}Ru_{1/3}O$, $La_{2/5}Ru_{1/5}O$, or $La_{3/7}Ru_{1/7}O$.

In Formula 1, the content (x) of L, the content (y) of Ru, and the content (z) of oxygen may satisfy the ranges of $0<x<1$, $0<y<1$, and $0<z\leq1$, respectively. In Formula 1, x may be, for example, about 0.1 to about 0.5, about 0.2 to about 0.4, or about 0.25 to about 0.35. For example, y may be about 0.1 to about 0.5, about 0.2 to about 0.4, or about 0.25 to about 0.35. For example, z may be about 0.5 to about 1, about 0.6 to about 1, or about 0.7 to about 1, for example, may be about 1. When x, y, and z are within these ranges, the metal oxide may have alkali resistance.

In Formula 1, when z=1, the content (x) of L and the content (y) of Ru may be calculated with respect to 1 mole of oxygen (O), and represented as a relative molar ratio. The contents of L and Ru may be stoichiometrically calculated by conversion based on 1 mole of oxygen (O).

In the metal oxide represented by Formula 1, the value of z may be selected to include more oxygen vacancies, thus providing improved ionic conductivity. For example, in the metal oxide including oxygen defects, the position of the state density function may be shifted near Fermi energy, and thus a band gap between the valance band and the conduction band may be reduced. As a result, the metal oxide of Formula 1 may have improved electronic conductivity.

The metal oxide represented by Formula 1 may be porous with a specific surface area of about 2 square meters per gram (m²/g) or greater. The specific surface area of the metal oxide may be, for example, about 2.5 m²/g or greater, about 3 m²/g or greater, about 3.5 m²/g or greater, or about 4 m²/g or greater. For example, the specific surface area of the metal oxide may be about 2 m²/g to about 10 m²/g, about 2.5 m²/g to about 9.5 m²/g, about 3 m²/g to about 9 m²/g, about 3.5 m²/g to about 8.5, or about 4 m²/g to about 8 m²/g. By having a specific surface area within these ranges, the metal oxide may have a capacity of about 3 mAh/cm² or greater per unit area and have a desirable energy density. As the specific surface area of the metal oxide is increased, the porosity may be increased, and the positive electrode may have increased capacity.

In an aspect, the metal oxide may have a porosity of about 0.01 to about 0.8, about 0.1 to about 0.7, or about 0.2 to about 0.5. Porosity may be determined by nitrogen or helium adsorption, for example.

The metal oxide represented by formula 1 may be crystalline, and may have various crystal structures according to the values of x, y, and z in Formula 1.

For example, the metal oxide may have a perovskite crystal structure. For example, the metal oxide may have a crystal structure in at least one of an orthorhombic phase, a monoclinic phase, a hexagonal phase, or a tetragonal phase.

Figure 1:
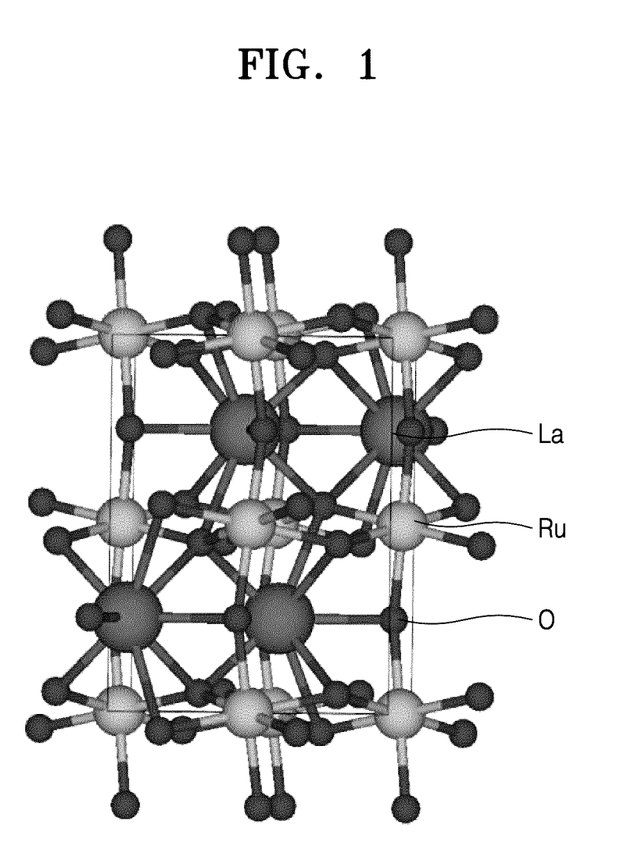
FIG. 1 is a schematic view illustrating a crystal structure of an embodiment of a metal oxide used in a positive electrode.

For example, $La_{7/26}Ru_{4/13}O$ (i.e., $La_7Ru_8O_{26}$ in stoichiometry), which is within the range of metal oxides represented by Formula 1, may have a perovskite crystal structure including an orthorhombic phase as illustrated in FIG. 1. As another metal oxide, $La_{1/3}Ru_{1/3}O$ (i.e., $LaRuO_3$ in stoichiometry) may have a crystal structure different from that of the metal oxide in FIG. 1.

In an embodiment, the metal oxide may exhibit a diffraction peak of $LaRuO_3$ at a diffraction angle (2θ) of, for example, about 25.2° 2θ, about 31.0° 2θ, about 32.0° 2θ, about 33.0° 2θ or about 45.5° 2θ in the XRD spectrum thereof. In an embodiment, the metal oxide may exhibit a diffraction peak of $La_3RuO_7$ at a diffraction angle (2θ) of, for example, about 28.5° 2θ, about 30.7° 2θ, about 34.0° 2θ, about 39.5° 2θ, or about 40.6° 2θ in the XRD spectrum thereof. In an embodiment, the metal oxide may exhibit a combination of these diffraction peaks.

In an embodiment, a positive electrode including the metal oxide may have an electronic conductivity at 25° C. of, for example, about $1\times10^1$ S/cm or greater, for example, about $1\times10^2$ S/cm or greater, for example, about $1\times10^3$ S/cm or greater, for example, about $1\times10^5$ S/cm or greater, for example, about $5\times10^5$ S/cm or greater. For example, the positive electrode may have electronic conductivity of about $1\times10^1$ S/cm to about $1\times10^8$ S/cm, about $1\times10^2$ S/cm to about $1\times10^7$ S/cm, about $1\times10^3$ S/cm to about $1\times10^6$ S/cm, about $1\times10^4$ S/cm to about $1\times10^6$ S/cm, about $1\times10^5$ S/cm to about $1\times10^6$ S/cm, or about $5\times10^5$ S/cm to about $1\times10^6$ S/cm. By the inclusion of the metal oxide having electronic conductivity in these ranges, the positive electrode may improve performance and lifespan characteristics of the lithium-air battery.

In an embodiment, the positive electrode including the metal oxide may have an ionic conductivity at 25° C. of, for example, about $1.0 \times 10^{-9}$ S/cm or greater, for example, about $1.0 \times 10^{-8}$ S/cm or greater, for example, about $2.0 \times 10^{-7}$ S/cm or greater, for example, about $1.0 \times 10^{-6}$ S/cm or greater, for example, about $5.0 \times 10^{-6}$ S/cm or greater, for example, about $1.0 \times 10^{-5}$ S/cm or greater. The positive electrolyte including the metal oxide may have an ionic conductivity of, for example, about $1 \times 10^{-9}$ S/cm to about $1 \times 10^{-2}$ S/cm, about $1 \times 10^{-8}$ S/cm to about $5 \times 10^{-3}$ S/cm, about $1 \times 10^{-7}$ S/cm to about $1 \times 10^{-3}$ S/cm, about $2 \times 10^{-7}$ S/cm to about $5 \times 10^{-4}$ S/cm, about $1 \times 10^{-6}$ S/cm to about $1 \times 10^{-4}$ S/cm, about $5 \times 10^{-6}$ S/cm to about $5 \times 10^{-5}$ S/cm, or about $1 \times 10^{-5}$ S/cm to about $5 \times 10^{-5}$ S/cm. As the positive electrode has ionic conductivity in these ranges, the internal resistance of the lithium-air battery may be reduced.

The metal oxide may be included in the form of a particle. The metal oxide particle may have an average particle diameter of about 1 nm to about 500 μm, for example, about 5 nm to about 100 μm, for example, about 10 nm to about 50 μm, for example, about 100 nm to about 15 μm, for example, about 300 nm to about 10 μm, and may have a specific surface area of about 0.01 m²/g to about 1000 m²/g, for example, about 0.5 m²/g to about 100 m²/g or about 2 m²/g to about 10 m²/g. When the average particle diameter of the metal oxide is within these ranges, this may be advantageous in forming a porous positive electrode having a large contact area with air.

The metal oxide may have an average particle diameter of, for example, about 1 nm to about 1,000 nm, for example, about 1 nm to about 750 nm, for example, about 1 nm to about 500 nm, for example, about 5 nm to about 500 nm, for example, about 10 nm to about 200 nm, for example, about 10 nm to about 100 nm. The metal oxide having an average particle diameter within these ranges may be used to form a nano-porous positive electrode.

As used herein, the term "average particle diameter" means the diameter of particles if the particles are spherical, or the largest dimension if the particles are non-spherical particles, and corresponds to 50% of particles in the cumulative distribution of a 100% total number of particles from the smallest to the largest in particle size. The average particle diameter may be measured using a particle size analyzer, transmission electron microscope (TEM) images, or scanning electron microscope (SEM) images. As other examples of methods, the average particle diameter can be measured using a dynamic light scattering method, or by counting the number of particles within a given size range, analyzing data, and then calculating the average particle diameter.

As a large amount of an alkali material is produced during discharge, the internal condition of the positive electrode may become alkali. During discharge, the pH of the inner portion of the positive electrode may be in the range of about pH 8 to about pH 14. For example, the pH of the inner part of the positive electrode during discharge may be in the range of about pH 11 to about pH 14. For example, the pH of the inner part of the positive electrode during discharge may be in the range of about pH 12 to about pH 14. For example, the pH of the inner part of the positive electrode during discharge may be in the range of about pH 12 to about pH 13. For example, the pH of the inner part of the positive electrode during discharge may be in the range of about pH 12.5 to about pH 13.5. For example, the pH of the inner part of the positive electrode during discharge may be about pH 13. Even in such a basic atmosphere, the metal oxide may be structurally stable without deterioration, and may maintain high electronic conductivity.

The positive electrode may have a porous form, a planar form, a tubular form, or a combination thereof, but is not limited thereto. The positive electrode may have a variety of forms based on the shape of an electrochemical device.

According to an aspect, provided is a method of manufacturing a positive electrode including the electroconductive metal oxide represented by Formula 1.

In an embodiment, a method of manufacturing the positive electrode may include:

mixing an L-containing compound comprising at least one of a lanthanide element or an actinide element, a ruthenium (Ru)-containing compound, and a solvent to provide a mixture; and heat-treating the mixture to prepare the positive electrode, wherein the positive electrode includes a metal oxide represented by Formula 1, $$L_xRu_yO_z \quad \text{Formula 1}$$

wherein, in Formula 1,
L is at least one of a lanthanide element or an actinide element, and
$0<x<1$, $0<y<1$, and $0<z\leq1$, and wherein the metal oxide is porous and has a specific surface area of about 2 square meters per gram to about 10 square meters per gram.

L may be at least one of lanthanum (La), cerium (Ce), praseodymium (Pr), neodymium (Nd), promethium (Pm), actinium (Ac), thorium (Th), or protactinium (Pa).

The L-containing compound may be at least one of an L-containing oxide, an L-containing carbonate, an L-containing chloride, an L-containing phosphate, an L-containing hydroxide, an L-containing nitrate, or an L-containing hydroxide.

The Ru-containing compound may be a ruthenium oxide.

The solvent may be any solvent in which the L-containing compound and the Ru-containing compound can be dissolved or dispersed. The solvent may be, for example, at least one of ethanol, water, ethylene glycol, or isopropanol. The amount of the solvent may be in the range of about 100 parts by weight to 1,000 parts by weight, for example, about 300 parts by weight to 600 parts by weight, with respect to 100 parts by weight of the total weight of the element (L)-containing compound and the Ru-containing compound.

The mixing may be performed using any suitable mixing method, for example, milling, blending, or sputtering. The milling may be performed using, for example, a ball mill, an air-jet mill, a bead mill, a roll mill, or the like.

The L-containing compound, the ruthenium (Ru)-containing compound, and the solvent, which are starting materials, may be mixed using, for example, ball-milling or a planetary mixer to prepare a mixture.

The prepared mixture may be heat-treated to thereby form a metal oxide represented by Formula 1.

$$L_xRu_yO_z \quad \text{Formula 1}$$

In Formula 1, L may be at least one of a lanthanide element or an actinide element, $0<x<1$, $0<y<1$, and $0<z\leq1$.

In an embodiment, the heat-treating may include:
a first heat-treating of the mixture to form a first heat-treated product; and
a second heat-treating of the first heat-treated product.

The second heat-treatment may be performed at a higher temperature than the first heat-treatment. The first heat-treatment may be performed, for example, at a temperature in the range of about 500° C. to about 1100° C. The second heat-treatment may be performed at a temperature in the range of about 800° C. to about 1700° C.

The first heat-treatment of the mixture may be performed at a temperature increase rate of about 1° C./min to about 10° C./min. When the temperature increase rate in the first heat-treatment is within this range, the heat-treatment may proceed sufficiently to form a crystalline structure sought to be obtained, and may be economical since the synthesis time is short. The first thermal treatment temperature may be in the range of about 500° C. to about 1100° C., for example, about 600° C. to about 1000° C., for example, about 700° C. to 900° C. The temperature increase rate in the first heat-treatment is within these ranges, the heat-treatment may proceed sufficiently to lead to crystal growth, and a crystalline metal oxide of Formula 1 may be obtained through the second heat-treatment.

The first heat-treatment may be performed in an oxidizing gas atmosphere. The oxidizing gas atmosphere may be created using, for example, air or oxygen. The first heat-treatment time may vary according to the first heat-treatment, and may be in the range of, for example, about 1 to about 20 hours, for example, about 1 to about 10 hours, for example, about 2 to about 5 hours.

Subsequently, a second heat-treatment may be performed on the first heat-treatment product. The temperature increase rate in the second thermal treatment may be about 1° C./min to about 10° C./min. When the temperature increase rate in the second heat-treatment is within this range, the heat-treatment may sufficiently proceed to form a desired crystalline structure, and it is also economical due to short synthesis time. The second heat-treatment may be performed in the range of about 800° C. to about 1700° C., for example, about 900° C. to about 1600° C., for example, about 1000° C. to about 1500° C., for example, about 1100° C. to about 1400° C. By using the second heat-treatment at temperatures within these ranges, a desired crystalline metal oxide of Formula 1 may be obtained.

In an embodiment, the second heat-treatment may be performed at a temperature higher than the first heat-treatment. By performing the second heat-treatment at a higher temperature than the first heat-treatment, crystallinity may be improved.

The second heat-treatment may be performed under, for example, an oxidizing gas atmosphere, a reducing gas atmosphere, or an inert gas atmosphere.

The oxidizing gas atmosphere may be created with, for example, air or oxygen, the reducing gas atmosphere may be created with a reducing gas such as hydrogen, and the inert gas atmosphere may be created with an inert gas such as nitrogen, argon, or helium.

The second heat-treatment time may vary depending on the second heat-treatment temperature or the like. The second heat-treatment time may be, for example, in a range of about 1 hour to about 50 hours, or for example, in a range of about 6 hours to 48 hours.

After the second heat-treatment, the metal oxide of Formula 1 may be formed.

In an embodiment, the method may further include grinding the obtained product after the first heat-treatment or the second heat-treatment. The powder particles obtained through the grinding may have a size of about 500 µm or less, for example, about 1 nm to about 500 µm, about 5 nm to about 100 µm, about 10 nm to about 50 µm, about 100 nm to about 15 µm, or about 300 nm to about 10 µm. When the size of the ground particles is within these ranges, the particle size is small enough such that grinding and mixing are sufficient, and crystal phase formation of a desired metal oxide represented by Formula 1 may be facilitated. As used herein, the term "size" indicates the average particle diameter of particles when the particles are spherical, or refers to the major axis length when the particles are non-spherical. The size may be measured using a scanning electron microscope or a particle size analyzer.

The metal oxide according to an embodiment thus obtained may have excellent electronic conductivity, and may be chemically stable under basic conditions, and thus, for example, may be used as a positive electrode material having excellent durability in a metal-air battery using an aqueous solution or vapor as an electrolyte.

According to an aspect, provided is an electrochemical device using a positive electrode including the electroconductive metal oxide represented by Formula 1. The electrochemical device includes the metal oxide, which may be chemically stable under basic conditions and has high electric conductivity, and thus may significantly improve lifespan characteristics of the electrochemical device.

The electrochemical device may be, for example, at least one of a battery, an accumulator, a supercapacitor, a fuel cell, a sensor, or an electrochromic device. However, embodiments are not limited thereto. Any suitable electrochemical device may be used.

The battery may be, for example, a primary battery or a secondary battery. The battery may be, for example, a lithium battery, a sodium battery, or the like. However, embodiments are not limited thereto, and any suitable may be used. The lithium battery may be, for example, a lithium-ion battery or a lithium-air battery. However, embodiments are not limited thereto. Any suitable lithium battery may be used. The electrochromic device may be an electrochemical mirror, a window, or a screen. However, embodiments are not limited thereto. Any suitable electrochromic device may be used.

The electrochemical device may be, for example, a metal-air battery. The metal-air battery may include a positive electrode. The positive electrode may be an air electrode, and may be arranged on a positive electrode current collector.

The positive electrode may be, for example, porous. When the positive electrode is porous, diffusion of air or oxygen into the positive electrode may be facilitated.

The metal-air battery may be, for example, a lithium-air battery.

According to an aspect, the lithium-air battery may include the positive electrode, a negative electrode including at least one of lithium or a lithium alloy, and an electrolyte interposed between the positive electrode and the negative electrode.

By the use of the positive electrode including an electroconductive metal oxide represented by Formula 1 as described above, the lithium-air battery may have improved lifespan characteristics.

The lithium-air battery may include the positive electrode according to an embodiment, and the positive electrode may be arranged, for example, on a positive electrode current collector.

The positive electrode may include the electroconductive metal oxide represented by Formula 1. An amount of the metal oxide may be in a range of about 1 part to about 100 parts by weight, for example, about 10 parts to about 100 parts by weight, for example, about 50 parts to about 100 parts by weight, for example, about 60 parts to 100 parts by weight, for example, about 80 parts to 100 parts by weight, or for example, about 90 parts to 100 parts by weight, each with respect to 100 parts by weight of the positive electrode. For example, the positive electrode may substantially consist of the metal oxide according to an embodiment. The positive electrode obtained by sintering and/or pressing the metal oxide in powder form may substantially consist of the metal oxide.

In manufacturing the positive electrode, pores may be introduced into the positive electrode by using a pore-forming agent.

The positive electrode may be in the form of porous pellets, a porous sheet, or the like. However, embodiments are not limited thereto. The positive electrode may have any form depending on a shape of the battery. When the positive electrode substantially consists of the mixed conductor, the positive electrode may have a simple structure, and it may be easy to manufacture the positive electrode. For example, the positive electrode may be pervious to gas such as oxygen, air, or the like. Accordingly, the positive electrode according to an embodiment is distinguished from an existing positive electrode that is substantially impervious to gas such as oxygen, air, or the like and conducts only ions. The positive electrode according to an embodiment may be porous and/or pervious to gas, and thus oxygen, air, or the like may be easily diffused into the positive electrode. In addition, lithium ions and/or electrons may also easily migrate through the mixed conductor in the positive electrode. Accordingly, electrochemical reactions by oxygen, lithium ions, and electrons may be facilitated in the positive electrode.

In an embodiment, in manufacturing the positive electrode, a common conductive material may be added, in addition to the metal oxide, to improve electronic conductivity and ionic conductivity. For example, the conductive material may be porous. Due to the porosity of the conductive material, air permeation may be facilitated. The conductive material may be any suitable material having porosity and/or conductivity. For example, the conductive material may be a carbonaceous material having porosity. The carbonaceous material may be, for example, at least one of carbon black, graphite, graphene, activated carbon, or carbon fiber. However, embodiments are not limited thereto. Any suitable carbonaceous material may be used. The conductive material may be, for example, a metallic material. For example, the metallic material may be at least one of a metal fiber, metal mesh, a metal powder, or the like. The metal powder may be, for example, copper, silver, nickel, or aluminum in powder form. The conductive material may be, for example, an organic conductive material. The organic conductive material may be, for example, a polyphenylene derivative, a polythiophene derivative, or the like. For example, the above-listed conductive materials may be used alone or in a combination thereof. The positive electrode according to an embodiment may include a composite conductor as the common conductive material. The positive electrode according to an embodiment may include any of the above-listed conductive materials, in addition to the composite conductor.

In an embodiment, the positive electrode may include a catalyst for oxidation/reduction of oxygen. Examples of the catalyst may include at least one of a precious metal-based catalyst such as platinum, gold, silver, palladium, ruthenium, rhodium, or osmium; oxide-based catalysts such as manganese oxide, iron oxide, cobalt oxide, or nickel oxide; or an organic metal-based catalyst such as cobalt phthalocyanine. However, embodiments are not limited thereto. Any suitable catalyst for oxidation/reduction of oxygen may be used.

In an embodiment, the catalyst may be supported on a catalyst support. The catalyst support may be an oxide support, a zeolite support, a clay-based mineral support, a carbon support, or the like. The oxide support may be a metal oxide support including at least one of aluminum (Al), silicon (Si), zirconium (Zr), titanium (Ti), cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). Examples of the oxide support may include alumina, silica, zirconium oxide, or titanium dioxide. Examples of the carbon support may include at least one of carbon black such as Ketjen black, acetylene black, channel black, or lamp black; graphite such as natural graphite, artificial black, or expandable graphite; activated carbons; or carbon fibers. However, embodiments are not limited thereto. Any suitable catalyst support may be used.

In an embodiment, the positive electrode may include a binder. For example, the binder may include a thermoplastic resin or a thermocurable resin. For example, the binder may be at least one of polyethylene, polypropylene, polytetrafluoroethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, embodiments are not limited thereto. Any suitable binder may be used.

In an embodiment, the positive electrode may be manufactured by mixing the metal oxide, optionally a conductive material, a catalyst for oxidation/reduction of oxygen, and a binder together and adding an appropriate solvent thereto to prepare a positive electrode slurry, and coating the positive electrode slurry on a surface of a substrate and drying a coated resultant, or optionally compression-molding a dried product to improve an electrode density. For example, the substrate may be a positive electrode current collector, a separator, or a solid electrolyte membrane. For example, the positive electrode current collector may be a gas diffusion layer. The conductive material may be, for example, a composite conductor. For example, the catalyst for oxidation/reduction of oxygen and the binder may be omitted.

In an embodiment, the lithium-air battery may include a negative electrode. The negative electrode may include at least one of lithium or a lithium alloy.

In an embodiment, the negative electrode may be, for example, a lithium metal thin film or a lithium-based alloy thin film. The lithium-based alloy may be, for example, a lithium alloy with, for example, at least one of aluminum, tin, magnesium, indium, calcium, titanium, or vanadium.

The lithium-air battery according to an embodiment may include an electrolyte between the positive electrode and the negative electrode.

For example, the electrolyte may include at least one of a solid electrolyte, a gel electrolyte, or a liquid electrolyte. The solid electrolyte, the gel electrolyte, and the liquid electrolyte are not specifically limited. Any suitable electrolyte may be used.

In an embodiment, the solid electrolyte may include at least one of a solid electrolyte including an ionically conducting inorganic material, a solid electrolyte including a polymeric ionic liquid (PIL) and a lithium salt, a solid electrolyte including an ionically conducting polymer and a lithium salt, or a solid electrolyte including an electronically conducting polymer. However, embodiments are not limited thereto. Any suitable solid electrolyte may be used.

For example, the ionically conducting inorganic material may include at least one of a glass or amorphous metal ion conductor, a ceramic active metal ion conductor, and a glass ceramic active metal ion conductor. However, embodiments are not limited thereto. Any suitable ionically conducting inorganic material may be used. For example, the ionically conducting inorganic material may be ionically conducting inorganic particles or a formed product thereof, for example, in sheet form.

For example, the ionically conducting inorganic material may be at least one of $BaTiO_3$, $Pb(Zr_aTi_{1-a})O_3$ (wherein $0 \leq a \leq 1$) (PZT), $Pb_{1-x}La_xZr_{1-y}Ti_yO_3$ (PLZT) (wherein $0 \leq x < 1$ and $0 \leq y < 1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$ (wherein $0<x<2$ and $0<y<3$), lithium aluminum titanium phosphate ($Li_xAl_yTi_z(PO_4)_3$) (wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$), lithium lanthanum titanate ($Li_xLa_yTiO_3$, wherein $0<x<2$, and $0<y<3$), lithium germanium thio phosphate ($Li_xGe_yP_zS_w$, wherein $0<x<4$, $0<y<1$, $0<z<1$, and $0<w<5$), lithium nitride ($Li_xN_y$, wherein $0<x<4$, and $0<y<2$), $SiS_2$-based glass ($Li_xSi_yS_z$) (wherein $0<x<3$, $0<y<2$, and $0<z<4$), $P_2S_5$-based glass ($Li_xP_yS_z$) (wherein $0<x<3$, $0<y<3$, and $0<z<7$), $Li_2O$-based, LiF-based, LiOH-based, $Li_2CO_3$-based, $LiAlO_2$-based, or $Li_2O$—$Al_2O_3$—$SiO_2$—$P_2O_5$—$TiO_2$—$GeO_2$-based ceramics, or Garnet-based ceramics ($Li_{3+x}La_3M_2O_{12}$) (wherein M is at least one of Te, Nb, or Zr and $2<x<6$).

For example, the polymeric ionic liquid (PIL) may include: i) a cation of at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation; and ii) at least one of $BF_4^-$, $PF_6^-$, $AsF_6^-$, $SbF_6^-$, $AlCl_4^-$, $HSO_4^-$, $ClO_4^-$, $CH_3SO_3$—, $CF_3CO_2^-$, $(CF_3SO_2)_2N^-$, $Cl^-$, $Br^-$, $I$—, $SO_4^-$, $CF_3SO_3$—, $(C_2F_5SO_2)_2N^-$, $(C_2F_5SO_2)(CF_3SO_2)N$—, $NO_3^-$, $Al_2Cl_7^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$. For example, the polymeric ionic liquid (PIL) may be poly(diallyldimethylammonium) bis(trifluoromethanesulfonyl)imide (TFSI), poly(1-allyl-3-methylimidazolium bis(trifluoromethanesulfonyl)imide), or poly((N-methyl-N-propylpiperidinium bis(trifluoromethanesulfonyl)imide.

The ionically conducting polymer may include at least one ion conductive repeating unit of an ether-based monomer, an acryl-based monomer, a methacryl-based monomer, or a siloxane-based monomer.

The ionically conducting polymer may include, for example, polyethylene oxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride (PVdF), or Li-substituted Nafion. However, embodiments are not limited thereto. Any suitable ionically conducting polymer may be used.

The electronically conducting polymer may be, for example, a polyphenylene derivative or a polythiophene derivative. However, embodiments are not limited thereto. Any suitable electronically conducting polymer may be used.

In an embodiment, the gel electrolyte may be obtained, for example, by adding a low-molecular weight solvent to a solid electrolyte interposed between the positive electrode and the negative electrode. The gel electrolyte may be a gel electrolyte obtained by further adding a low-molecular weight organic compound such as a solvent, an oligomer, or the like to a polymer.

In an embodiment, the liquid electrolyte may include a solvent and a lithium salt.

The solvent may include at least one of an organic solvent, an ionic liquid (IL), or an oligomer. However, embodiments are not limited thereto. Any suitable solvent available that is in liquid form at room temperature (25° C.) may be used.

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxyethane (e.g., 1,2-dimethoxyethane), 2-methyltetrahydrofuran, or tetrahydrofuran. However, embodiments are not limited thereto. The organic solvent may be any suitable organic solvent that is in liquid form at room temperature.

The ionic liquid (IL) may include, for example, i) at least one of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation, and ii) at least one of $BF_4^-$, $PF_6^-$, $AsF_6^-$, $SbF_6^-$, $AlCl_4^-$, $HSO_4^-$, $ClO_4^-$, $CH_3SO_3$—, $CF_3CO_2^-$, $(CF_3SO_2)_2N^-$, $Cl^-$, $Br^-$, $I$—, $SO_4^-$, $CF_3SO_3$—, $(C_2F_5SO_2)_2N$—, $(C_2F_5SO_2)(CF_3SO_2)N$—, $NO_3^-$, $Al_2Cl_7^-$, $CH_3COO^-$, $(CF_3SO_2)_3C^-$, $(CF_3CF_2SO_2)_2N$—, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3$—, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$.

The lithium salt may include at least one of lithium bis(trifluoromethylsulphonyl)imide (LiTFSI), $LiPF_6$, $LiBF_4$, $LiAsF_6$, $LiClO_4$, $LiNO_3$, (lithium bis(oxalato) borate (Li- BOB), $LiCF_3SO_3$, $LiN(SO_2CF_3)_2$, $LiN(SO_2C_2F_5)_2$, $LiN(SO_2F)_2$, $LiC(SO_2CF_3)_3$, $LiN(SO_3CF_3)_2$, $LiC_4F_9SO_3$, $LiAlCl_4$, or $LiCF_3SO_3$. However, embodiments are not limited thereto. Any suitable lithium salt may be used. A concentration of the lithium salt may be, for example, about 0.01 M to about 5 M, about 0.05 M to about 4.5 M, about 0.1 M to about 4 M, or about 1 M to about 3 M.

In an embodiment, the lithium-air battery may further include a separator between the positive electrode and the negative electrode. Any separator may be used as long as the separator is durable under operating conditions of the lithium-air battery. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. Two or more separators may be used in combination.

For example, the electrolyte may have a structure in which a solid polymer electrolyte is impregnated in the separator, or a structure in which a liquid electrolyte is impregnated in the separator. For example, the electrolyte in which a solid polymer electrolyte is impregnated in the separator may be prepared by arranging solid polymer electrolyte films on opposite surfaces of the separator, and roll-pressing them at the same time. For example, the electrolyte in which a liquid electrolyte is impregnated in the separator may be prepared by injecting a liquid electrolyte including a lithium salt into the separator.

In an embodiment, the lithium-air battery may be manufactured by installing the negative electrode on an inner side of a case, sequentially arranging the electrolyte on the negative electrode, the positive electrode on the electrolyte, and a porous positive electrode current collector on the positive electrode, and then arranging a pressing member on the porous positive electrode current collector to press a resulting cell structure with the pressing member, which allows air to be transferred to the air electrode (i.e., positive electrode). The case may be divided into upper and lower portions which contact the negative electrode and the air electrode, respectively. An insulating resin may be disposed between the upper and lower portions of the case to electrically insulate the positive electrode and the negative electrode from one another.

The lithium-air battery may be used as a lithium primary battery or a lithium secondary battery. The shape of the lithium-air battery may be, for example, a coin, a button, a sheet, a stack, a cylinder, a plane, or a horn. However, embodiments are not limited thereto. The lithium-air battery may be used in a large battery for an electric vehicle.

Figure 6:
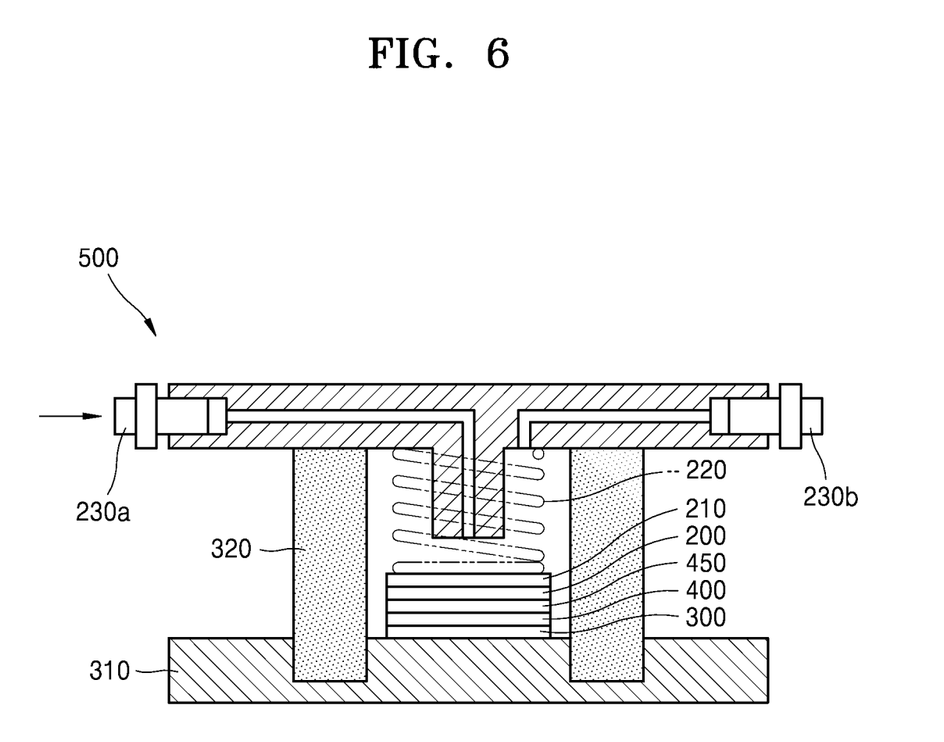
FIG. 6 is a schematic view of an embodiment illustrating a structure of a lithium-air battery.

FIG. 6 is a schematic view illustrating an embodiment of a structure of a lithium-air battery 500.

Referring to FIG. 6, the lithium-air battery 500 according to an embodiment may include a positive electrode 200, including the metal oxide represented by Formula 1, the positive electrode 200 being adjacent to a first current collector 210 and using oxygen as an active material, an negative electrode 300 adjacent to a second current collector 310 and including lithium, and a first electrolyte 400 interposed between the positive electrode 200 and the negative electrode 300. The first electrolyte 400 may be a separator impregnated with a liquid electrolyte.

A second electrolyte 450 may be arranged between the positive electrode 200 and the first electrolyte 400. The second electrolyte 450 may be a lithium-ion conductive solid electrolyte membrane. The first current collector 210 may be porous and function as a gas diffusion layer, which allows diffusion of air. A pressing member 220 for transporting air to the positive electrode 200 may be arranged on the first current collector 210.

A case 320 made of an insulating resin may be disposed between the positive electrode 200 and the negative electrode 300 to electrically insulate the positive electrode 200 and the negative electrode 300 from one another. The air may be supplied into the lithium-air battery 500 through an air inlet 230a and may be discharged through an air outlet 230b. The lithium-air battery 500 may be prepared in a stainless steel container.

The term "air" used herein is not limited to atmospheric air, and for convenience, may refer to a combination of gases including oxygen, or pure oxygen gas. This broad definition of the term "air" also applies to any other terms used herein, including "air battery" and "air electrode."

The metal-air battery according to any of the embodiments may be useful in any field to which secondary batteries are applied.

The present disclosure will now be described in detail with reference to the following examples. However, these examples are only for illustrative purposes and are not intended to limit the scope of the one or more embodiments of the present disclosure.

EXAMPLES

Preparation Example 1: Preparation of Metal Oxide 
$La_{7/26}Ru_{4/13}O$

A mixture of 1.63 g of $La_2O_3$ and 1.99 g of $RuO_2$ with 2 mL of dichloroethane was mixed using a ball mill into which five zirconia balls were added, at a speed of 1700 rpm for 8 hours. After the mixture was thermally treated at 800° C. for 5 hours, the mixture was sintered at 1300° C. for 12 hours to obtain metal oxide crystals.

As a result of X-ray diffraction (XRD) analysis, the major component of the metal oxide was identified to be $La_7Ru_6O_{26}$, i.e., $La_{7/26}Ru_{4/13}O$. The specific surface area of the metal oxide is 10 m$^2$/g.

Preparation Example 2: Preparation of Metal Oxide 
$La_{1/3}Ru_{1/3}O$

A mixture of 1.66 g of $La_2O_3$ and 1.35 g of $RuO_2$ with 2 mL of dichloroethane was mixed using a ball mill with five zirconia balls added at a speed of 1700 rpm for 8 hours. After the mixture was thermally treated at 800° C. for 5 hours, the mixture was sintered at 1300° C. for 12 hours to obtain metal oxide crystals.

As a result of X-ray diffraction (XRD) analysis, the major component of the metal oxide was identified to be $LaRuO_3$, i.e., $La_{1/3}Ru_{1/3}O$. The specific surface area of the metal oxide is 10 m$^2$/g.

Example 1: Manufacture of Positive Electrode and Lithium-Air Battery

After the metal oxide $La_{7/26}Ru_{4/13}O$ prepared in Preparation Example 1 and a polymer binder (B79, Eastman Chemical Company) were mixed in a ratio of 10:3 by weight to prepare 100 mg/mL of an ethanol dispersion, the dispersion was processed into a sheet form and dried to manufacture a positive electrode having a thickness of 10 μm.

The positive electrode was disposed on a lithium aluminum titanium phosphate (LATP) membrane (having a thickness of about 250 μm, available from Ohara Corp., Japan), a solid electrolyte membrane, and then heat-treated at 350° C. to obtain a laminate of the positive electrode/solid electrolyte membrane laminate.

Then, as a negative electrode intermediate layer, a polymer electrolyte was disposed under the solid electrolyte membrane. The solid electrolyte was prepared by mixing polyethylene oxide (Mn=1,0000 Daltons) and lithium bis (trifluoromethanesulfonyl)imide (LiTFSI) as a lithium salt, with 100 mL of water, to be a 20:1 molar ratio of ethylene oxide (EO) to Li.

A lithium metal foil was arranged on a lower surface of the polymer electrolyte, and a gas diffusion layer (GDL, 25BC, available from SGL) was arranged on an upper surface of the positive electrode. A nickel mesh was arranged on the gas diffusion layer, and then pressed and fixed with a pressing member to allow transfer of air to the positive electrode, to thereby manufacture a lithium-air battery.

Example 2: Manufacture of Positive Electrode and Lithium-Air Battery

A positive electrode and a lithium-air battery were manufactured through the same process as in Example 1, except that the metal oxide $La_{1/3}Ru_{1/30}$ prepared in Preparation Example 2 was used instead of the metal oxide $La_{7/26}Ru_{4/13}O$ prepared in Preparation Example 1.

Comparative Example 1: Manufacture of Positive Electrode and Lithium-Air Battery A positive electrode and a lithium-air battery were manufactured through the same process as in Example 1, except that $RuO_2$ was used instead of the metal oxide $La_{7/26}Ru_{4/13}O$ prepared in Preparation Example 1.

Comparative Example 2: Manufacture of Positive Electrode and Lithium-Air Battery A positive electrode and a lithium-air battery were manufactured through the same process as in Example 1, except that Printex® carbon (Orion Engineered Carbons Co., Ltd), a carbonaceous positive electrode material, was used instead of the metal oxide $La_{7/26}Ru_{4/13}O$ prepared in Preparation Example 1.

Evaluation Example 1: X-Ray Diffraction (XRD) Spectrum Evaluation

Figure 2:
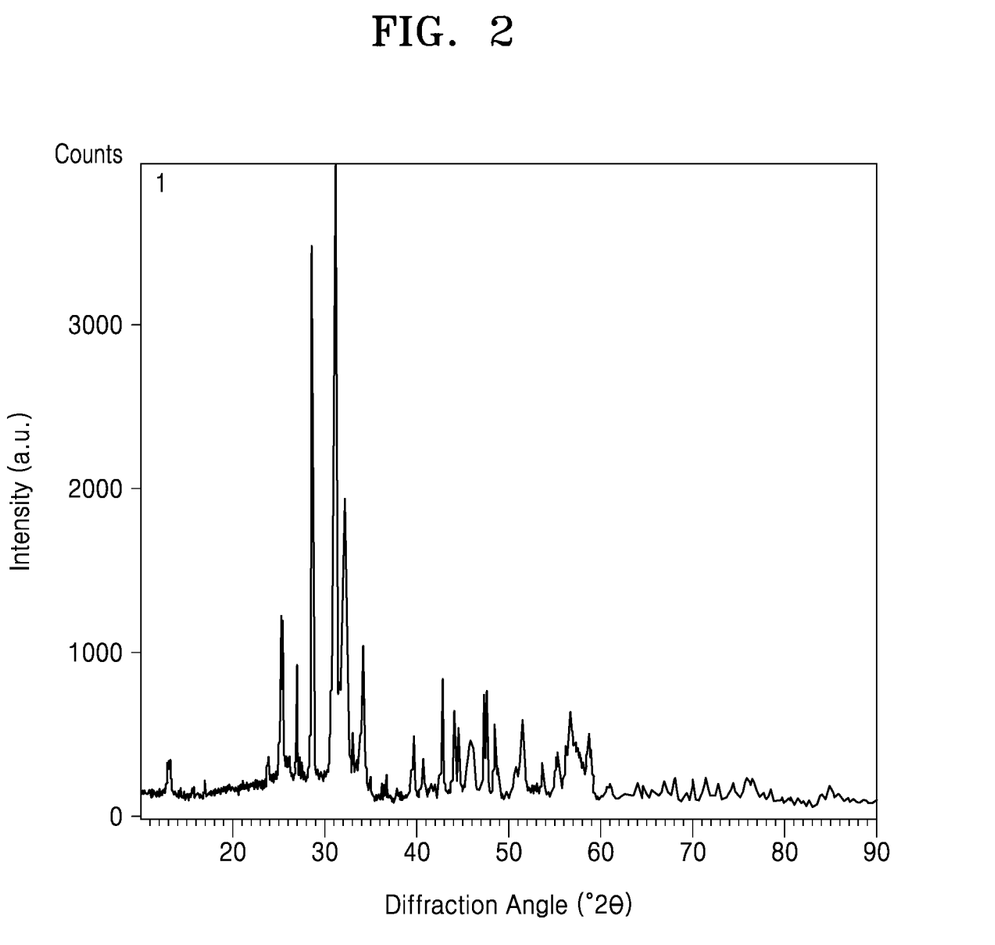
FIG. 2 is a graph of intensity (arbitrary units (a.u.)) versus diffraction angle (°2θ) illustrating the results of X-ray diffraction (XRD) analysis of a metal oxide $La_7Ru_8O_{26}$ prepared in Preparation Example 1, when analyzed by X-ray diffraction (XRD) using Cu Kα radiation.
Figure 3:
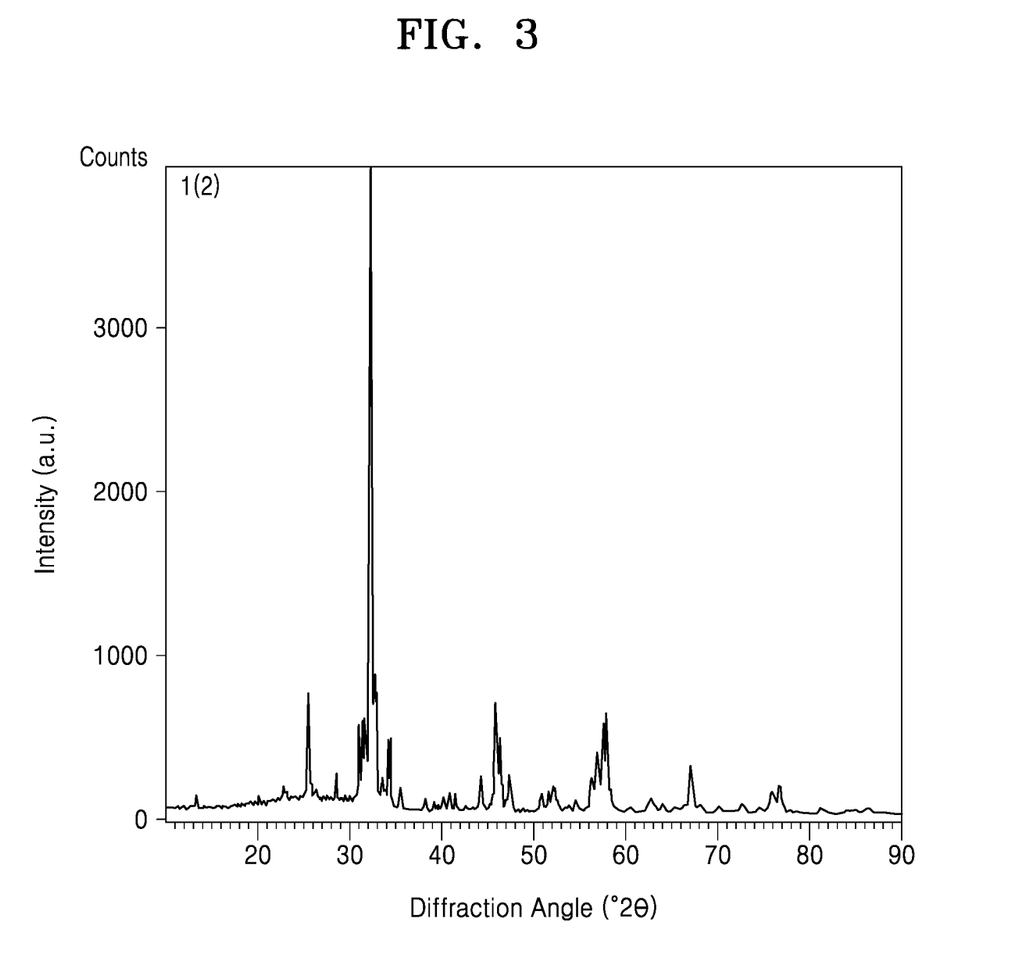
FIG. 3 is a graph of intensity (arbitrary units (a.u.)) versus diffraction angle (°2θ) illustrating the results of XRD analysis of a metal oxide LaRuO$_3$ prepared in Preparation Example 2, when analyzed by X-ray diffraction (XRD) using Cu Kα radiation.

After grinding the metal oxide crystals prepared in Preparation Examples 1 and 2, XRD spectra thereof were measured, and the results are shown in FIGS. 2 and 3, respectively. The XRD analysis was performed using a Bruker D8 Advance with Cu Kα radiation.

As shown in the XRD analysis results of FIG. 2, the major component of the metal oxide of Preparation Example 1 was identified to have a mixed composition of $La_3RuO_7$ (i.e., $La_{3/7}Ru_{1/7}O$) and $LaRuO_3$ (i.e., $La_{1/3}Ru_{1/3}O$).

As shown in the XRD analysis results of FIG. 3, the major component of the metal oxide of Preparation Example 2 was identified to be $LaRuO_3$ (i.e., $La_{1/3}Ru_{1/3}O$).

Evaluation Example 2: Evaluation of Electronic Conductivity

Ion-blocking cells were manufactured by sputtering gold (Au) onto opposite surfaces of each of the positive electrodes manufactured in sheet form in Examples 1 and 2 and Comparative Examples 1 and 2. Electronic conductivities of the ion-blocking cells were measured using a direct current (DC) polarization method.

While applying a constant voltage of about 100 mV to each of the completed symmetric cells for about 30 minutes, a time-dependent current of the cell was measured. An electronic resistance of each of the positive electrodes was calculated from the measured current, and an electronic conductivity was calculated from the calculated electronic resistance. The calculated electronic conductivities are represented in Table 1, along with the results of lifespan characteristic evaluation of Evaluation Example 3.

TABLE 1

| Example | Cathode material | Electronic conductivity (S/cm) | Lifespan (number of cycles) |
|---|---|---|---|
| Example 1 | $La_{7/26}Ru_{4/13}O$ | $1.3 \times 10^5$ | 19 |
| Example 2 | $La_{1/3}Ru_{1/3}O$ | $2.2 \times 10^5$ | 15 |
| Comparative Example 1 | $RuO_2$ | $5.2 \times 10^5$ | 7 |
| Comparative Example 2 | Printex ® carbon | 5 | 8 |

As shown in Table 1, it was found that the positive electrode materials used in Examples 1 and 2 had a far higher electronic conductivity and remarkably improved lifespan characteristics, as compared with the carbon material used in Comparative Example 2. $RuO_2$ used in Comparative Example 1 had a slightly higher electronic conductivity, but very poor lifespan characteristics, as compared with the positive electrode materials used in Examples 1 and 2.

Evaluation Example 3: Evaluation of Charge-Discharge Characteristics of Lithium-Air Battery The lithium-air batteries manufactured in Example 1 and Comparative Example 1 were each subjected to a charge-discharge cycle of discharging at about 60° C. under an oxygen atmosphere of about 1 atm with a constant current of about 0.3 mA/cm² until a voltage reached 2.2 V (with respect to Li) and then charging with a constant current until a voltage reached 4.5 V. The results of the charge-discharge test at the 1$^{st}$ cycle of each of the lithium-air batteries are shown in FIG. 4.

Figure 4:
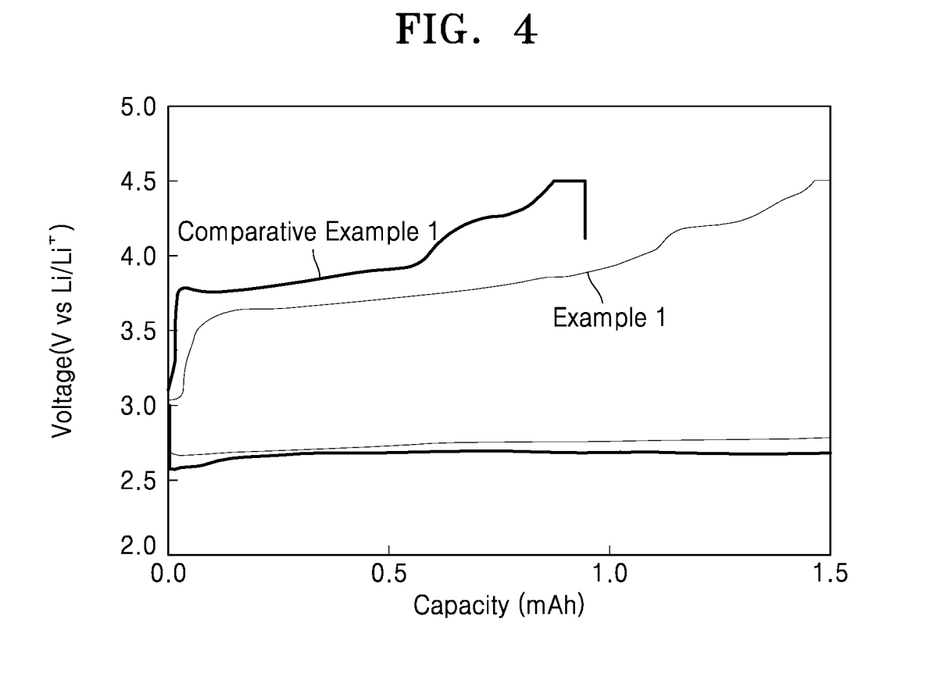
FIG. 4 is a graph of voltage (V vs. Li/Li$^+$) versus capacity (milliampere hours (mAh)) illustrating changes in capacity according to voltage in lithium-air batteries manufactured in Example 1 and Comparative Example 1.

As shown in FIG. 4, it was found that the lithium-air battery of Example 1 using the metal oxide-containing positive electrode had a reduced overvoltage during charge and discharge, and could be reversibly charged and discharged, as compared with the lithium-air battery of Comparative Example 1 using $RuO_2$. Without wishing to be bound by theory, this is believed to be attributable to enhanced bonding between particles of the metal oxide used in Example 1, as compared with $RuO_2$ used in Comparative Example 1. From these results, it was found that the lithium-air battery of Example 1 operated more stably than the lithium-air battery of Comparative Example 1.

Figure 5:
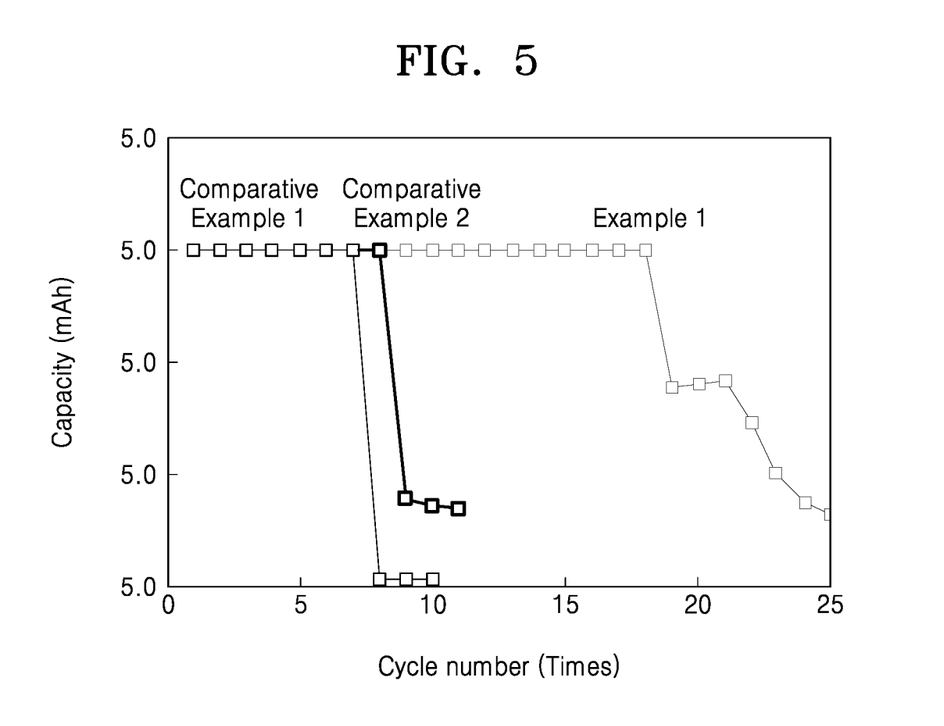
FIG. 5 is a graph of capacity (mAh) versus cycle number (times) illustrating the results of measurement of discharge capacity according to cycle number in lithium-air batteries manufactured in Example 1 and Comparative Examples 1 and 2.

After a first charge-discharge cycle was performed using the lithium-air batteries of Examples 1 and 2, and Comparative Examples 1 and 2 in the same manner as described above, lifespan was measured while charging and discharging each lithium-air battery at a current density of 0.3 mA/cm², and the results are shown in FIG. 5.

As shown in FIG. 5, it was found that the lithium-air batteries of Examples 1 and 2 had improved alkali resistance, and thus remarkably improved lifespan characteristics, as compared with the lithium-air batteries of Comparative Examples 1 and 2.

The results of the lifespan measurement on the lithium-air batteries of Examples 1 and 2, and Comparative Examples 1 and 2 are also represented in Table 1.

As described above, a positive electrode may be chemically stable under alkali conditions, and may be used in a variety of metal-air batteries, including a lithium-air battery, to improve lifespan characteristics.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
a positive electrode layer including a positive electrode support, a lithium-ion conductive solid electrolyte membrane; and a porous electroconductive metal oxide represented by Formula 1;
a negative electrode layer comprising at least one of a metal or a metal alloy; and
an electrolyte disposed between the positive electrode layer and the negative electrode layer, the electrolyte being a solid electrolyte, a gel electrolyte, or a liquid electrolyte:
wherein the porous electroconductive metal oxide is disposed on the lithium-ion conductive solid electrolyte membrane,
and has a specific surface area of about 3 square meters per gram to about 10 square meters per gram, and a porosity of about 0.2 to about 0.5, $$L_xRu_yO_z \qquad \text{Formula 1}$$

wherein, in Formula 1,
L is at least one of a lanthanide element or an actinide element, and
$0<x<1$, $0<y<1$, and $0<z\leq1$.

2. The metal-air battery of claim 1, wherein, in Formula 1, L is at least one of lanthanum, cerium, praseodymium, neodymium, promethium, actinium, thorium, or protactinium.

3. The metal-air battery of claim 1, wherein the electroconductive metal oxide represented by Formula 1 L is lanthanum.

4. The metal-air battery of claim 1, wherein the electroconductive metal oxide represented by Formula 1 comprises at least one of $La_{7/26}Ru_{4/13}O$, $La_{1/3}Ru_{1/3}O$, $La_{2/5}Ru_{1/5}O$, or $La_{3/7}Ru_{1/7}O$.

5. The metal-air battery of claim 1, wherein the electroconductive metal oxide represented by Formula 1 has a perovskite crystal structure.

6. The metal-air battery of claim 1, wherein the electroconductive metal oxide represented by Formula 1 has a crystal structure comprising an orthorhombic phase, a monoclinic phase, a hexagonal phase, or a tetragonal phase.

7. The metal-air battery of claim 1, wherein a pH inside the positive electrode is in a range of about 8 to about 14 during discharge.

8. The metal-air battery of claim 4, wherein the electroconductive metal oxide represented by Formula 1 exhibits diffraction peaks at diffraction angles of about 25.2° 2θ, about 31.0° 2θ, about 32.0° 2θ, about 33.0° 2θ, and about 45.5° 2θ, diffraction peaks at diffraction angles of about 28.5° 2θ, about 30.7° 2θ, about 34.0° 2θ, about 39.5° 2θ, about 40.6° 2θ or a combination thereof, when analyzed by X-ray diffraction using Cu Kα radiation.

9. The metal-air battery of claim 1, wherein an electronic conductivity at 25° C. of the positive electrode comprising the metal oxide is about $1\times10^1$ siemens per centimeter to about $1\times10^8$ siemens per centimeter.

10. The metal-air battery of claim 1, wherein an ionic conductivity at 25° C. of the positive electrode comprising the metal oxide is about $1\times10^{-9}$ siemens per centimeter to about $1\times10^{-2}$ siemens per centimeter.

11. The metal-air battery of claim 1, wherein the electroconductive metal oxide represented by Formula 1 has an average particle diameter of about 1 nanometer to about 1,000 nanometers.

12. The metal-air battery of claim 1, wherein the positive electrode has at least one of a porous form, a planar form, or a tubular form.

13. The metal-air battery of claim 1, wherein the electroconductive metal oxide represented by Formula 1 is represented by at least one of $La_{3/7}Ru_{1/7}O$ or $La_{1/3}Ru_{1/3}O$.

14. The metal-air battery of claim 1, wherein the negative electrode layer comprises at least one of lithium or a lithium alloy.

15. The metal-air battery of claim 1, wherein the electrolyte is the solid electrolyte, and the solid electrolyte is selected from a polymeric ionic liquid and a lithium salt, an ionically conducting polymer and a lithium salt, or an electronically conducting polymer.

16. The metal-air battery of claim 1, wherein the electrolyte comprises at least one of an aqueous solution or an aqueous vapor.

17. An electrochemical device comprising the metal-air battery of claim 1.

18. The electrochemical device of claim 17, wherein the electrochemical device further comprises at least one of an accumulator, a supercapacitor, a fuel cell, a sensor, or an electrochromic device.

19. The metal-air battery of claim 1 wherein the electroconductive metal oxide represented by Formula 1 is $La_{3/7}Ru_{1/7}O$.

20. The metal-air battery of claim 15, wherein the solid electrolyte is the ionically conducting polymer and the lithium salt, which is selected from the group consisting of polyethylene oxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride (PVdF), and Li-substituted Nafion.

21. The metal-air battery of claim 1, wherein the electrolyte is the liquid electrolyte.

22. The metal-air battery of claim 1, wherein the electrolyte is the gel electrolyte.

\* \* \* \* \*